(12) United States Patent
Frerking et al.

(10) Patent No.: US 8,837,759 B2
(45) Date of Patent: *Sep. 16, 2014

(54) SYSTEM AND METHOD FOR ENHANCING THE INDUCTIVE COUPLING BETWEEN A HEARING AID OPERATING IN TELECOIL MODE AND A COMMUNICATIONS DEVICE

(71) Applicant: AT&T Mobility II LLC, Atlanta, GA (US)

(72) Inventors: Melvin Duane Frerking, Norcross, GA (US); George O'Quinn Hirvela, Carrollton, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/648,313

(22) Filed: Oct. 10, 2012

(65) Prior Publication Data

US 2013/0034254 A1   Feb. 7, 2013

Related U.S. Application Data

(63) Continuation of application No. 12/854,231, filed on Aug. 11, 2010, now Pat. No. 8,300,865, which is a continuation of application No. 11/201,557, filed on Aug. 11, 2005, now Pat. No. 7,783,067.

(51) Int. Cl.
    *H04R 25/00* (2006.01)
(52) U.S. Cl.
    USPC .......................................... 381/315; 381/312
(58) Field of Classification Search
    CPC .......... H04R 25/00; H04M 1/00; H04M 9/00; H04M 11/00; H04B 5/00
    USPC .................. 381/312–215, 323, 326, 330–331
    See application file for complete search history.

(56) References Cited

U.S. PATENT DOCUMENTS

| | | | |
|---|---|---|---|
| 3,659,056 A | 4/1972 | Morrison et al. |
| 4,697,283 A | 9/1987 | Lafrance |
| 5,086,464 A | 2/1992 | Groppe |
| 5,615,229 A | 3/1997 | Sharma |
| 5,835,610 A | 11/1998 | Ishige |
| 5,842,115 A | 11/1998 | Dent |
| 5,991,420 A | 11/1999 | Stern |
| 6,078,675 A | 6/2000 | Bowen-Nielsen |
| 6,122,500 A | 9/2000 | Dent et al. |
| 6,307,945 B1 | 10/2001 | Hall |
| 6,505,780 B1 | 1/2003 | Yassin et al. |
| 6,594,370 B1 | 7/2003 | Anderson |
| 6,684,063 B2 | 1/2004 | Berger et al. |

(Continued)

*Primary Examiner* — Suhan Ni
(74) *Attorney, Agent, or Firm* — Parks IP Law LLC; Mickki D. Murray, Esq.

(57) ABSTRACT

A method and system to optimize the relative position of an inductive field of a hearing aid compatible device and a telecoil of a hearing assistive device, are provided. A Steerable Hearing Aid Compatible Device (SHAD) has a steerable inductive field for locating an inductive field in accordance with the location of a telecoil in the hearing assistive device. A Telecoil Hearing Assistive Device (THAD) has a telecoil and telecoil orientation tag. The location of the telecoil of the THAD is determined with respect to a reference system and this telecoil location information is stored on the telecoil orientation tag as Telecoil Location Information (TLI) and provided to the SHAD. In an exemplary embodiment the telecoil orientation tag may be an RFID tag that is read by a tag reader of the SHAD. The SHAD receives the TLI and generates an inductive field in accordance with the TLI, such as a position that is parallel to the telecoil of the THAD.

14 Claims, 8 Drawing Sheets

(56) References Cited

U.S. PATENT DOCUMENTS

| | | |
|---|---|---|
| 6,694,034 B2 | 2/2004 | Julstrom |
| 6,694,143 B1 | 2/2004 | Beamish et al. |
| 6,724,862 B1 | 4/2004 | Shaffer et al. |
| 6,747,561 B1 | 6/2004 | Reeves |
| 6,816,083 B2 | 11/2004 | Brandt |
| 7,042,986 B1 | 5/2006 | Lashley et al. |
| 7,108,177 B2 | 9/2006 | Brookner |
| 7,304,585 B2 | 12/2007 | Suomela et al. |
| 2003/0045283 A1 | 3/2003 | Hagedom |
| 2006/0025172 A1 | 2/2006 | Hawker |
| 2006/0126873 A1 | 6/2006 | Lee |
| 2006/0147069 A1 | 7/2006 | Svajda |

SYSTEM AND METHOD FOR ENHANCING THE INDUCTIVE COUPLING BETWEEN A HEARING AID OPERATING IN TELECOIL MODE AND A COMMUNICATIONS DEVICE

CROSS REFERENCE TO RELATED APPLICATION

This application is a continuation of U.S. application Ser. No. 11/201,557, filed Aug. 11, 2005, the entirety of which is herein incorporated by reference.

FIELD OF THE INVENTION

The present invention relates generally to systems and methods used for controlling the characteristics of a Hearing Aid Compatible Device (HACD), such as a cellular telephone, radio, or electronic file player. More specifically, the present invention is directed to enhancing the inductive coupling between an HACD and a hearing aid in telecoil mode by adjusting the location and orientation of a generated inductive field in response to the location and orientation of the telecoil of the hearing aid.

BACKGROUND

Hearing aids typically use a microphone and an amplifier to receive and amplify sound. But this arrangement can result in feedback when a telephone earpiece is placed up to the wearer's ear. Thus, hearing aids frequently come with an alternate input device referred to as a "telecoil" and a means to switch the hearing aid from a microphone mode to a telecoil mode, or a combination microphone/telecoil mode.

A hearing aid telecoil is an induction coil that typically consists of a rod encircled by turns of a copper wire. When placed in a varying magnetic field, an alternating current is induced in the wire so that the telecoil may receive the electrical audio signal from an inductive field emitted from a HACD, such as a telephone. Thus, a user can pick up the sound by coupling the telecoil to an inductive field, thereby bypassing background noise and preventing feedback associated with a sound wave signal.

Unfortunately, a telecoil may also pick up unwanted electromagnetic interference (EMI) from a variety of sources, such as power transformers, fluorescent lighting, trains and digital wireless telephones. Interference from digital wireless phones is of particular concern given the explosion in the use of such devices and the variety of EMI associated with their use, such as that caused by radio frequency (RF) emissions, display backlighting, display strobing, and processor noise.

The strength of the electrical current induced in a hearing aid telecoil is dependent on the strength of the magnetic field and the relative position of the telecoil with respect to the inductive field generated by the HACD. Maximum inductive coupling is created when the electromagnetic field created by the HACD is parallel to the hearing aid telecoil and minimum inductive coupling occurs when the electromagnetic field is orthogonal to the telecoil. Thus, it is desirable to orient the inductive field parallel to the telecoil when coupling a hearing aid and HACD.

Because it is often difficult for a hearing aid user to obtain the proper relative positioning between the HACD and the hearing aid telecoil, users are often compelled to reorient the HACD in an effort to find a "hot spot" where the inductive field of the HACD is relatively parallel to the telecoil. This often results in a position of the device that is not only uncomfortable but not optimal for the device operation.

Further complicating the matter is that during the hearing aid manufacturing process, the telecoil is subject to reorientation or shifting. For example, in-the-canal (ITC) and completely-in-the-canal (CIC) hearing aids are manufactured using techniques that allow most or all of the hearing aid electronics to be molded into a unit that fits into the ear canal, whereby the telecoil can wind up in virtually any position. Thus, the telecoil orientation may be different even between two hearing aids that are produced by the same manufacturer.

Thus, there is a need for a system and method for optimizing the inductive coupling between an HACD and a telecoil of a hearing aid worn by a user without the user having to reorient the HACD.

SUMMARY

The present invention solves the aforementioned problems, and others, by optimizing the relative position of the inductive field of a hearing aid compatible device and a telecoil of a hearing aid to provide an effective coupling of the generated inductive field with the hearing aid telecoil.

In exemplary embodiments, the systems and methods described herein are directed to controlling the inductive field created by a Hearing Aid Compatible (HAC) device based on the orientation and location of a telecoil of a hearing aid with which it communicates. One embodiment of a system claimed herein includes a Steerable Hearing Aid Compatible Device (SHAD) and a Tagged Hearing Assistive Device (THAD). As taught herein, the THAD may provide information regarding the location and orientation of a telecoil within the THAD. As also taught herein, a SHAD is any electronic device capable of steering an emitted or transmitted inductive field in response to the orientation of a telecoil of a Hearing Assistive Device (HAD) including a hearing aid. By way of example and not limitation, SHADs may include wireless devices, radios, electronic file players, and electronic signal transmitters of all kinds, including those in communication with devices capable of transmitting to multiple individuals, headsets, ear buds, telecommunication devices of all types, and the like. Further, a SHAD is configured to interface with and operate in response to the particular attributes of a THAD, or in response to the absence thereof.

In one embodiment, a THAD worn by or associated with a hearing impaired user is interrogated or read by the SHAD to determine the Telecoil Location and orientation Information (TLI). It is contemplated that the phrase "location and orientation information" refers to information defining the three dimensional location of a telecoil such that its position and orientation can be determined. Here the TLI may be stored on a Telecoil Orientation Tag (TOT) such as an RFID tag or similar device, which may be integral to the THAD. In some embodiments, more than one THAD may be worn, such as when a user requires a THAD for each ear. TLI may include the location and orientation of a telecoil within a THAD, such as the coordinates of the telecoil in a predetermined reference system, such as the x, y, z coordinates of a Cartesian coordinate system. In other embodiments, any suitable reference system may be used.

Exemplary embodiments of apparatuses and systems that incorporate a SHAD are taught herein. In one embodiment, the SHAD is in the form of a wireless communication device (WCD) such as, but not limited to, a short-wave radio, walkie-talkie, cellular telephone, and the like. There, the SHAD may comprise a TLI Reader for interrogating, reading, or otherwise communicating with a THAD, and may further comprise a receiver, processor, amplifier, sensor steerable inductor array, and memory coupled to the processor. The memory may store information regarding various aspects of the SHAD or the THAD, Other embodiments may further comprise an antenna, an analog to digital converter in communication with the receiver and processor, and a digital to analog converter in communication with the processor and amplifier. In operation, the WCD delivers a sound signal to a user via an inductive field generated according to the parameters provided by the TLI.

In another exemplary embodiment, a SHAD forms a Steerable Telecoil Module (STM). There the SHAD comprises a signal source in communication with a module, the module comprising a TLI Reader for interrogating, reading, or otherwise communicating with a sensor (such as a TOT), a processor, an amplifier, a memory in communication with the sensor and processor, and a steerable inductor. By way of example, a signal source is any electronic device comprising a receiver, database, processor, or computer readable medium configured to transmit, emit, or otherwise process an audio signal. In operation, the STM retrieves information related to the location and orientation of a telecoil in a device with which the STM will communicate, and creates an inductive field for delivering the audio signal to the device, orienting the inductive field according to the location and orientation of the telecoil for optimal coupling.

In an exemplary method, the SHAD may work in a non-enhanced mode when it is not in communication with a THAD, thereby allowing the inductive field created by the SHAD to be oriented in a standard or default orientation, such as an orientation that is appropriate for the typical position of a telecoil of a hearing aid when the hearing aid is worn by a user. When the SHAD is activated, such as by an automated proximity activation device, interrogation, or manual switching, it detects the presence of the THAD, interrogates the TOT and obtains the TLI and in response, generates and positions an inductive field in accordance with the TLI. If the user moves the SHAD from a THAD in one ear to a second THAD in the other ear, the TLI associated with the second THAD could be detected and in response the SHAD could provide a desired inductive field for the second THAD. The SHAD may likewise reconfigure itself to a hearing aid of other users fitted with a THAD.

Exemplary embodiments of methods that incorporate a SHAD are taught herein. In one exemplary embodiment, the orienting of the inductive field is activated in response to a communication from the TOT, including the transfer of the TLI stored on the TOT. In response to receiving the TLI, the SHAD operates in an enhanced mode, orienting the inductive field according to the TLI parameters.

Another exemplary embodiment of a method incorporates a SHAD that can switch to a non-enhanced mode. There, the orienting of the inductive field of the SHAD is activated in response to a communication from the TOT, including the transfer of the TLI stored on the TOT. In response to receiving the TLI, the SHAD operates in an enhanced mode, orienting the inductive field according to the TLI parameters. During enhanced mode operation, the SHAD may switch to a non-enhanced mode when the TOT is beyond communication range, such as when no response is received from an interrogation signal of the TOT Reader of the SHAD, such as when a user wearing a THAD walks away from a stationary SHAD. Thus, a SHAD may operate between enhanced and non-enhanced modes, depending on whether it is in communication with a TOT.

An additional exemplary embodiment of a method incorporates a SHAD that can switch between multiple enhanced modes. There, the orienting of the inductive field of the SHAD is activated in response to a communication from the TOT, including the transfer of a first TLI stored on a first TOT. In response to receiving the first TLI, the SHAD operates in a first enhanced mode, orienting the inductive field of the SHAD according to the first TLI parameters. During that enhanced mode of operation the SHAD may switch to a second enhanced mode operation in response to a communication from a second TOT, such as when a user wearing a first TOT passes a SHAD to a second ear associated with a second TOT. Accordingly, a SHAD may operate between as many different enhanced modes as it is in communication with different TOTs.

The invention also includes a means for orienting the magnetic field of the SHAD to match the orientation of a telecoil contained in the THAD. In an exemplary embodiment, a plurality of orthogonally positioned telecoils are provided and the phase of the signals to each of the telecoils is manipulated to create a steerable composite inductive field, which may be located in accordance with the location and orientation of the telecoil provided by the TLI. In another embodiment, a plurality of orthogonally positioned telecoils is provided and the amplitude of signals to each of the telecoils is manipulated to create a steerable composite field.

According to another aspect of the invention, a THAD is provided which includes a TOT having TLI. In an exemplary embodiment, the THAD is a hearing aid having a telecoil, the TOT is an RFID tag or similar transponder, and the TLI is the coordinates of the telecoil in a predetermined coordinate system. Those skilled in the art will recognize that and that, to avoid interfering with others hearing devices, short range FRID taps are preferred in hearing aid applications. The RFID tag may be active or passive.

According to another aspect of the invention a SHAD includes a TOT Reader for communicating information with the TOT, such as receiving data from the TOT such as the TLI, and a processor communicatively coupled to the TOT Reader for analyzing the TLI and causing the telecoils to create the desired inductive field. In some embodiments, a memory in communication with a processor may store one or more TLI coordinates, which are then selectively available by the user.

In another aspect of the invention, a system is established for providing the ability to determine the relative position of a telecoil in a hearing aid worn by a user and an inductive field created by a SHAD being used by a user. In an exemplary embodiment, a first reference system is created for the THAD, a second reference system is created for the SHAD, and these two reference systems are coordinated to a standard point. The coordinates of the location of the telecoil within a THAD may then be measured as coordinates in a predefined three dimensional reference system and stored on the THAD. These coordinates may then be retrieved by the SHAD and used to orient an inductive field to optimize the coupling between the inductive field and the telecoil.

DETAILED DESCRIPTION

Generally speaking, the systems and methods described herein are directed to generating and positioning an inductive field generated by a Hearing Aid Compatible Device (HACD) in accordance with the location and orientation of a telecoil of a Hearing Assistive Device (HAD), such as a hearing aid. By applying what is taught herein to HACDs, such a device can automatically configure its inductive field to the specific telecoil arrangement of a hearing aid.

As required, exemplary embodiments of the present invention are disclosed herein. These exemplary embodiments are, however, just that—examples, that may be embodied in many various and alternative forms. The figures are not to scale and some features may be exaggerated or minimized to show details of particular elements, while related elements may have been eliminated to prevent obscuring novel aspects. Therefore, specific structural and functional details disclosed herein are not to be interpreted as limiting, but merely as a basis for the claims and as a representative basis for teaching one skilled in the art to variously employ the present invention. For purposes of teaching and not limitation, the illustrated embodiments are directed to a communication device in the form of a cellular telephone.

Figure 1:
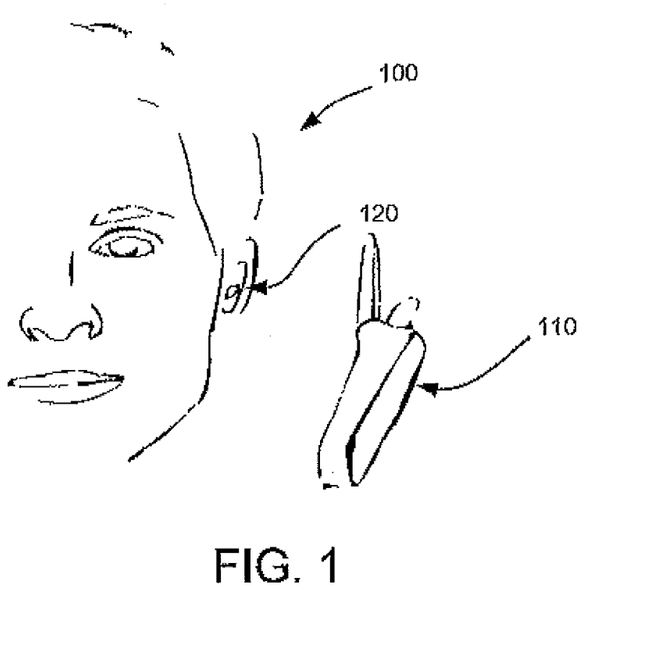
FIG. 1 illustrates an embodiment of an Enhanced Inductive Hearing Assistive System (EIHAS) in accordance with an exemplary embodiment of the present invention.

Referring now to the drawings, wherein like numerals represent like elements throughout, FIG. 1 illustrates a hearing impaired user interacting with an Enhanced Inductive Hearing Assistive System (EIHAS) 100. The illustrated EIHAS 100 comprises a Steerable Hearing Aid Compatible Device (SHAD) 110 having a steerable inductive field, and a Telecoiled Hearing Assistive Device (THAD) 120 having a telecoil. As described in detail below, the SHAD 110 creates an inductive field for communicating with the THAD 120 in accordance with the location and orientation of the telecoil within the THAD 120. The illustrated SHAD 110 is a cellular telephone, although it could be any potentially interfering device, including, a short-wave radio, walkie-talkie, and the like.

The illustrated THAD 120 is in the form of a hearing aid that includes a RFID tag. As understood by those skilled in the art, RFID tags are available in many variations and forms, including active, passive, semi-passive, and chipless. One purpose of a RFID tag is to store information, such as information related to the hearing aid, which may be accessed or retrieved upon demand. One type of information related to the hearing aid that may be stored on a RFID for future access and use, includes information regarding the location of the telecoil within the hearing aid. By location it is meant location in one or more dimensions so as to include the orientation of the telecoil.

Here, the RFID tag imbedded in the illustrated THAD 120 is a passive, read-only tag. Passive tags are not self-powered and are activated, typically, only upon interaction with an RFID reader. As understood by those skilled in the art, when radio waves from a reader reach a microchip antenna, the energy from those waves is converted by the antenna into electricity, which is used to power up the microchip in the RFID tag. The tag is then able to send back information stored on the microchip. Here also, for the purposes of teaching and not limitation, the information stored on the microchip of the passive tag in the THAD 120 is related to the THAD telecoil characteristics including the telecoil location and orientation, that is, the THAD's Telecoil Location Information (TLI). Embodiments of the EIHAS 100 may include any variation of RFID tag embodied in a THAD 120. In alternative embodiments, the RFID tag is active, or is powered by an external power source, such as a rechargeable battery in a cellular telephone.

Embodiments of the EIHAS 100 may include any variation of an audio equipped communication device. Here, the illustrated SHAD 110 is a cell phone, but as understood by those skilled in the art, a SHAD 110 comprises any audio device adapted to transmit a steerable inductive field for coupling with a hearing aid telecoil, such as speakers, radios, televisions, telephones, computers, personal digital assistants, wireless communications devices, record or disc or tape or CD or DVD players of all types, audio file decoders such as, but not limited to, MP3 players, devices equipped with speech recognition software, headphones, headsets, or parts thereof, and the like.

As described in greater detail herein, the SHAD 110 may be equipped with apparatus that receives and processes information stored in and transmitted by the THAD 120, such as the location and orientation of the telecoil within the THAD. Prior to discussing the apparatus regarding the SHAD 110 and THAD 120, the methods of operation directed to various embodiments of a EIHAS 100 will now be explained.

Figure 2A:
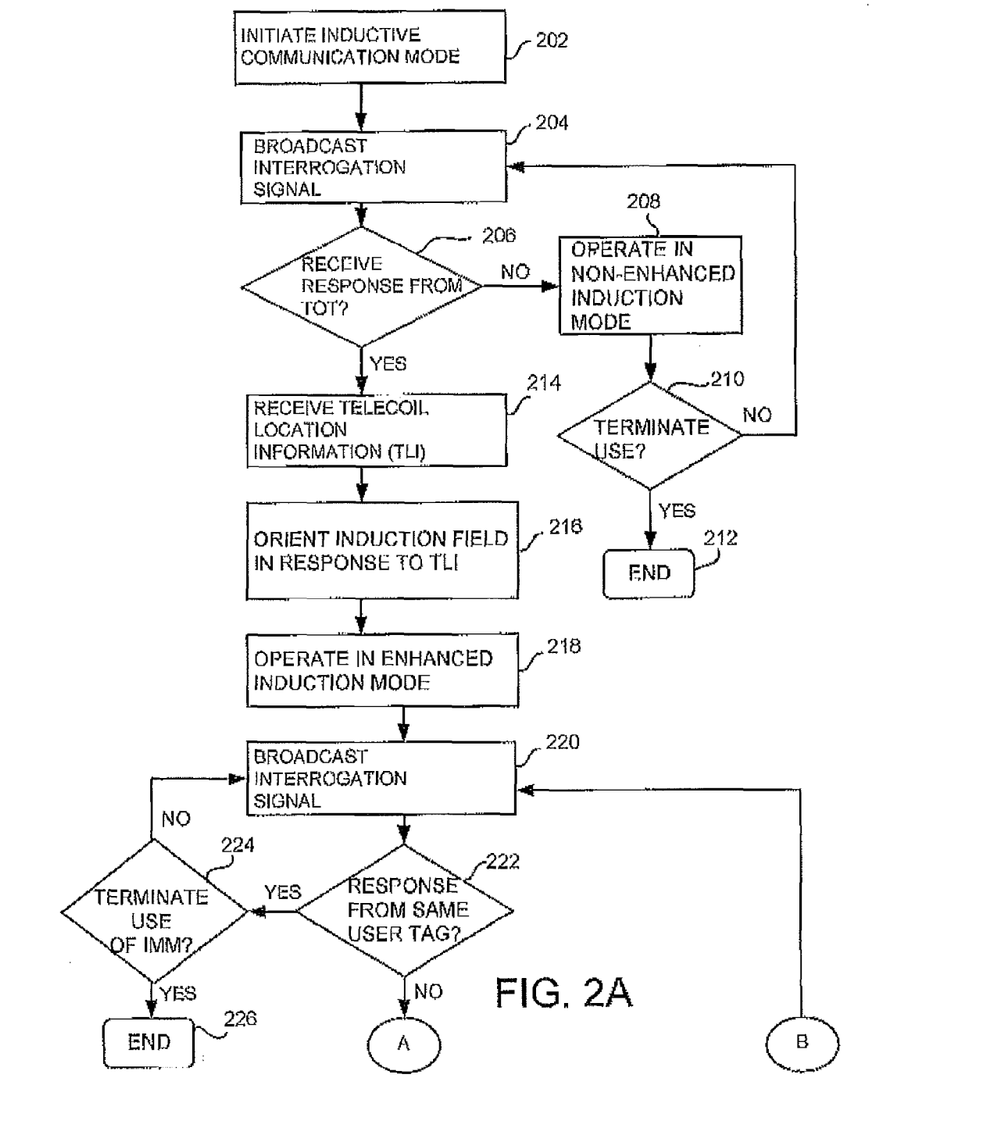
FIGS. 2A-2B are a flowchart illustrating a method in accordance with an exemplary embodiment of the present invention.
Figure 2B:
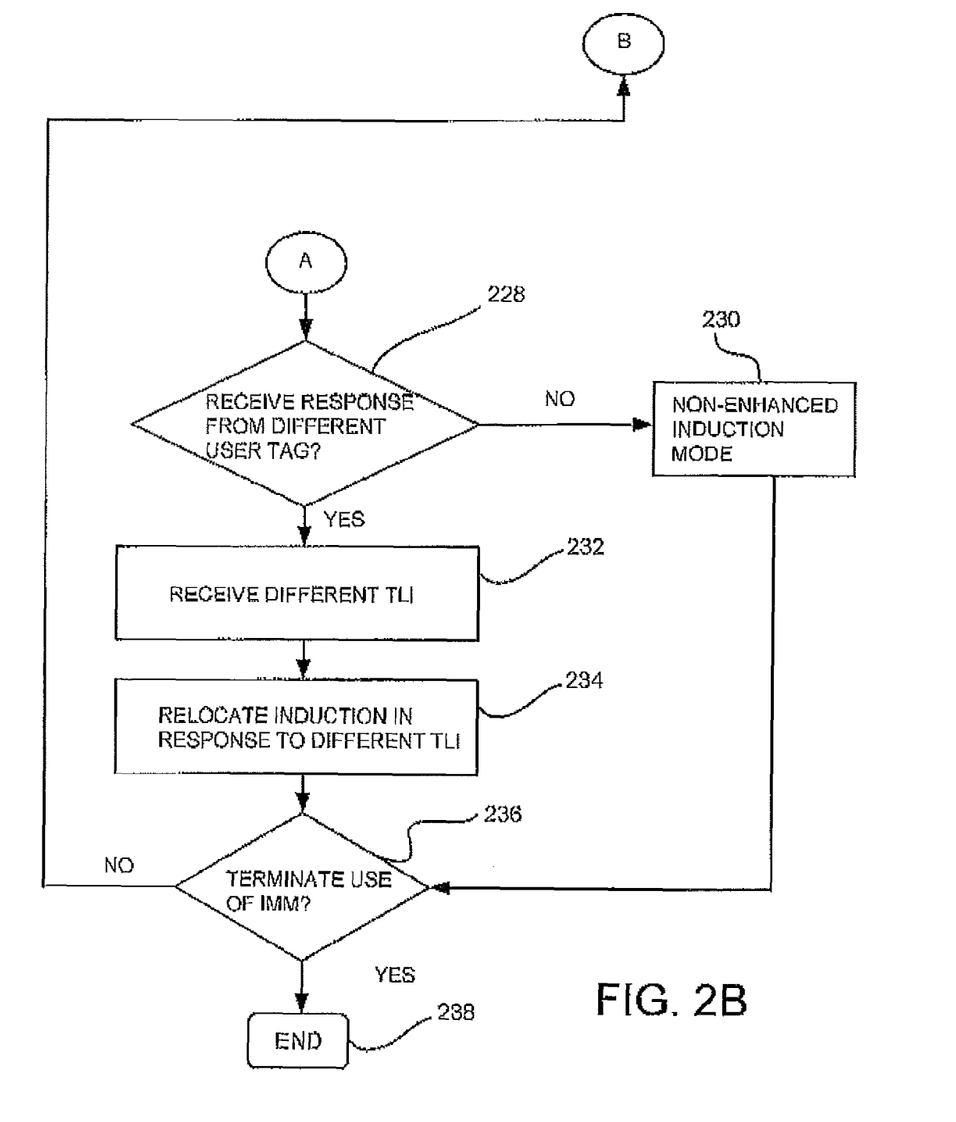

FIGS. 2A and 2B are a flowchart directed to various embodiments of the present invention. For the purpose of teaching and not of limitation, embodiments of the EIHAS 100 will be explained in terms of variations of two modes: a non-enhanced mode and an enhanced mode. The non-enhanced mode does not include reorienting the inductive field created by the SHAD in response to the telecoil location and orientation of a particular THAD. In other words, although an inductive mode of a SHAD 110 may be activated, the SHAD 110 operates in a non-enhanced mode by not reorienting the inductive field in response to the THAD specific information, such as a THAD's TLI. The enhanced mode includes reorienting the inductive field of the SHAD in response to THAD specific information, such as the location and orientation of the telecoil within a THAD. In other words, a THAD 120 may activate a SHAD 110, and in response the SHAD 110 operates in the enhanced mode by reorienting the inductive field generated by the SHAD in response to THAD specific information, such as a hearing aid's TLI.

Operation of an EIHAS 100 begins with the step of initiating the induction communication mode 202 of the SHAD 110. In the case of the illustrated hearing aid compatible cell phone, this step may be executed manually by simply pressing a switch. Alternatively, this step may be executed automatically such as by presence or proximity activation systems activated by various means for presence activation, such as but not limited to, a magnet; a pre-determined light source such as, but not limited to, a laser, LED, ultra-violet, or infra-red light; a predetermined sound signal or frequency; a Radio Frequency Identification (RFID) device; any other type of sensor; and the like.

With the SHAD 110 inductive communication mode activated, it periodically broadcasts an interrogation signal 204, for example at intervals of seconds or milliseconds, intended to be received by an RFID tag of a THAD. Alternative embodiments may broadcast the interrogation signal 204 while in a sleep or resting condition. As understood by those skilled in the art, a means for presence activation such as an RFID tag imbedded in the THAD 120 may be placed proximate to the SHAD 110, that is, within the reader field, to receive the interrogation signal 204 via the RFID tag's antenna. That signal energy may be converted by the antenna into electricity that can power up the chip in the RFID tag. The RFID tag is then able to send back stored information, such as a device's TLI to the SHAD.

As shown in FIG. 2A, if there is no response signal 206 from the THAD 120, the SHAD 110 may operate in the non-enhanced mode 208 until the user terminates use 210 and ends activation 212. In the case of the illustrated cell phone, ending activation may include pressing the OFF or HANG UP button located on the typical cell phone or pressing a switch to switch out of inductive mode. But while in the non-enhanced mode 208 and prior to ending 212, the SHAD 110 may continue to periodically broadcast the interrogation signal 204 in search of a response from a THAD 120 within the reader field. One reason for the periodic broadcast of an interrogation signal 204 is to provide for the situation wherein a SHAD 110 currently operated in non-enhanced without a corresponding THAD is passed to a user with a THAD and corresponding TLI. A similar situation may arise when a user switches the phone from one ear to another. In those situations, it may be preferred that the SHAD 110 switch between the enhanced and non-enhanced modes.

Continuing with reference to FIGS. 2A and 2B, if there is a response signal from a THAD 120, before or during the operation of the non-enhanced mode, the SHAD 110 receives that signal 214. In the illustrated embodiment, the step of receiving the signal 206 includes receiving a signal that comprises the TLI 214, in preparation of operating in the enhanced mode. The TLI may contain location and orientation information about the telecoil in the THAD, such as coordinates of the THAD telecoil in a predetermined reference system. The TLI may also include additional information such as the type, make, and model of the THAD. As will be understood by one of skill in the art, corresponding additional information may be stored on the SHAD 110 and retrieved by the SHAD 110, such information provided by a THAD 120 or loaded into the SHAD 110 separately. For example, the typical orientation of the THAD 120 in a user's ear may be stored in the SHAD and used in conjunction with the TLI provided from the THAD 120 in creating an inductive field as discussed more fully below.

Upon receiving, retrieving, uploading, or otherwise accessing the TLI 214, the SHAD 110 processes the TLI information and orients the inductive field 216 in accordance with the TLI. For example, a processor analyzes the TLI information and determines a desired location and orientation for an inductive field in order to effectively couple with the telecoil of the THAD 120. The processor may then steer the inductive field to the desired orientation such as by manipulating inputs to a plurality of orthogonally placed telecoils of the SHAD 110.

After orienting the inductive field 216, the SHAD 110 operates in the enhanced mode 218. While operating in enhanced mode, the SHAD 110 periodically broadcasts an interrogation signal 220 in a manner as explained above with regard to the step of broadcasting 204. If the enhanced mode interrogation signal 220 yields the same response signal 206 as the immediately previous enhanced mode interrogation signal 204, the SHAD 110 may continue to operate in the enhanced mode 218 until the user decides to terminate use 224 and end activation 226. However, if the enhanced mode interrogation signal 220 does not yield the same response signal 222 as the immediately previous enhanced mode interrogation signal 220, but yields a different response 228, the SHAD 110 may automatically switch to non-enhanced mode or to a different enhanced mode.

In the situation where the enhanced mode interrogation signal 220 yields no response, such as may happen when a user moves the SHAD 110 away from an ear having a THAD 120 and a corresponding TLI to a different ear without a THAD (FIG. 1), thus removing the THAD 120 from the reader field, the SHAD 110 may begin to operate in the non-enhanced mode 230. This switch from enhanced to non-enhanced mode may be accomplished by no longer orienting the inductive filed of the SHAD in response to a specific TLI, such as returning the location and orientation of the inductive field to a default position. The SHAD 110 may then operate in the non-enhanced mode 230 until the user decides to terminate use 236 and end activation 238 or until the interrogation signal 204 receives a response signal 206 and begins enhanced mode operation as described above.

In the situation where an enhanced mode interrogation signal 220 yields a response 228 different from the immediately previous enhanced mode interrogation signal 220, such as may happen after a user with a first THAD moves the SHAD 110 away from the first THAD 120 having a first TLI to his or her other ear associated with a second THAD 120 having a second TLI, or to a different user having still a third THAD 120 and TLI, the SHAD 110 may operate in and between each of the different enhanced modes as prompted by different THADs.

Upon receiving the signal designating a different TLI 232, the SHAD 110 receives, retrieves, uploads, or otherwise accesses the different TLI information in order to configure the inductive field best suited for coupling with the telecoil in the THAD 120, such as an inductive field parallel to the telecoil. As explained above with regard to Step 216, this processing may include manipulating the characteristics of orthogonal telecoils within the SHAD to steer the inductive field to a desired location and orientation. Instructions for this manipulation may be stored in either the SHAD 110, in the THAD 120, or jointly in both depending upon the selected parameter set that is needed to convey the TLI. Upon completing the step of providing the inductive field in response to a different TLI requirement 234, the SHAD 110 operates in that enhanced mode until it switches between enhanced and non-enhanced modes, or between enhanced modes, or until the user decides to terminate use 210, 224, 236 and end activation 212, 226, 238.

Figure 3:
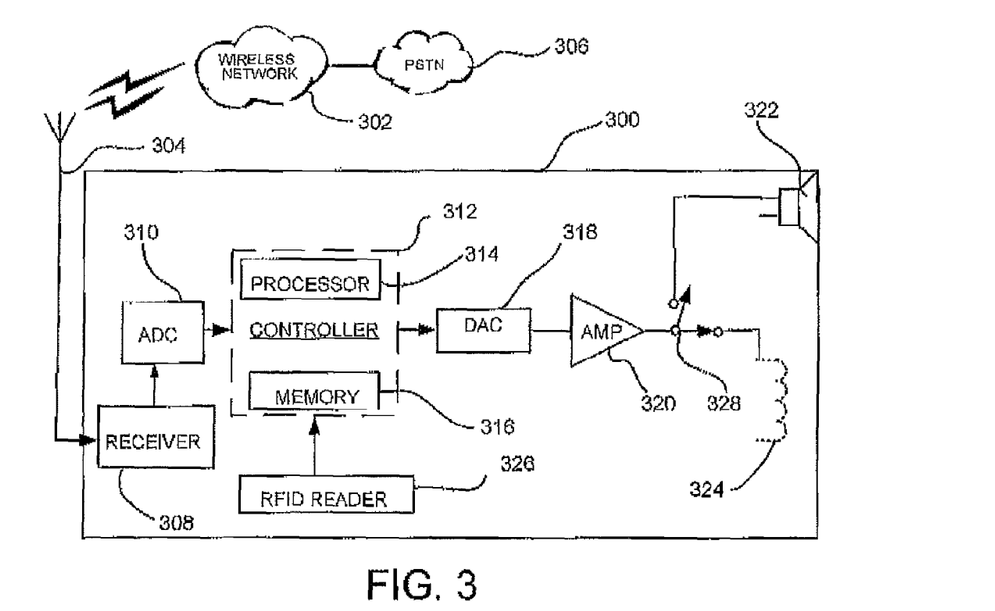
FIG. 3 is a block diagram of certain functional elements of the receive path of a wireless device including an Inductive Enhancing Hearing Assistive Device (IEHAD) in accordance with an exemplary embodiment of the present invention.

Apparatus of the present invention may be embodied in various and alternative configurations. Turning now to FIG. 3, there is shown an embodiment of a Steerable Hearing Aid Compatible Device (SHAD) in the form of a wireless communication device (WCD) 300. The WCD 300 is shown in the form of a Hearing Aid Compatible cellular telephone in communication with a wireless network 302 through an antenna 304. Optionally, the wireless network may be in communication with a public switched telephone network PSTN 306, or other accessible networks. The WCD 300 is a means for wireless communication as are all audio-equipped devices configured to receive wireless signals and transmit distinguishable sound waves, including: speakers, radios, televisions, walkie-talkies, receivers, audio equipped computers, audio-equipped Bluetooth® devices, as well as satellite linked audio-equipped devices, and the like.

The illustrated WCD 300 includes a receiver 308, analog to digital converter 310, a controller 312 which may include a processor 314 and memory 316, a digital to analog converter 318, an amplifier 320, a speaker 322, a steerable telecoil 324, an RFID reader 326 and a switch 328 all connected by a power and signal bus. It should be noted that the figure illustrates the receive path only. Elements not critical to the present teaching that are well understood by those skilled in the art, such as the power supply, are not discussed.

In operation, a wireless signal is received by the receiver 308 via the antenna 304. In the case of an audio signal, a first optional converter 310 converts an analog signal to a digital signal for processing by the controller 312. After the signal is processed, a second optional converter 318 converts the digital signal to an analog signal. The analog signal may be boosted by the amplifier 320 before being broadcast by the speaker 322 and or the steerable telecoil 324. The switch 328 may be manual or electronic in nature, to allow the switching of the amplified audio signal to either, or both, inductive or speaker mode of operation. For example, the controller may instruct the steerable telecoil to emit an inductive field to provide for the coupling of the steerable telecoil with the telecoil of a THAD.

The illustrated WCD 300 further includes an RFID Reader 326 in communication with controller 312 and stored memory 316. Further, the memory 316 is in communication with the micro-processor 314. The RFID reader may send interrogation signals and receive replies from RFID tags, in a manner described herein and as understood by those skilled in the art. More specifically, the RFID Reader 326 may interrogate an RFID tag of a hearing assistive device and receive telecoil location and orientation information or TLI from the hearing assistive device.

The RFID Reader 326 may serve as a presence activated sensor, and means for initiating an inductive communication mode of the WCD 300. The WCD 300 may also have a manual switch which may be activated by a user to activate the inductive communication mode. Other means may be used to initiate an induction mode including magnetic fields; a pre-determined sound or signal frequency; any RFID device; other sensors which indicate the presence of a hearing aid compatible device having a telecoil; and the like.

With the TLI loaded onto or otherwise accessible to the microprocessor 314, the illustrated WCD 300 is enabled to position the inductive field created by the WCD 300 according to the location and orientation of the hearing aid telecoil with which it communicates. That is, the WCD 300 is configured to operate in the enhanced inductive mode. By way of example and not limitation, a telephone call initiated on the PSTN 306 may be transmitted through the wireless network 302 and received by the receiver 308 via the antenna 304. The signals that comprise the telephone call may be output to a first converter 310 to be converted from analog to digital form before being output to the microprocessor 314. The microprocessor 314 processes the signal as known in the art and outputs the processed signal to the digital to analog converter 318 which converts the signal to analog and outputs the analog signal to the amplifier 320 for amplification and output to the speaker 322 and or the steerable telecoil 342. The controller 312, having accessed or received the TLI, determines the best position of the inductive field to be created by the steerable telecoil 324 and if in the enhanced inductive mode, instructs the steerable telecoil to emit such inductive field at a described location and orientation as described in more detail below.

Figure 4:
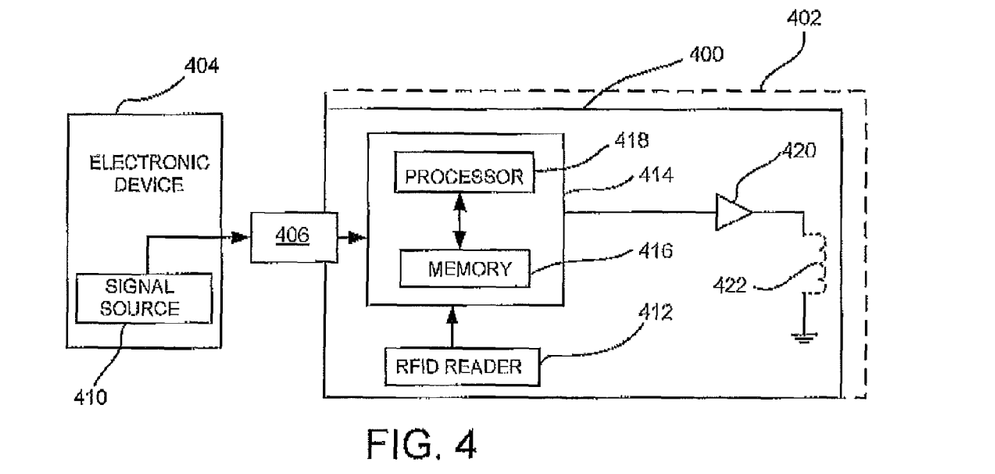
FIG. 4 is a block diagram of an embodiment of an Inductive Enhancing Hearing Assistive Module (IEHAM) in accordance with an exemplary embodiment of the present invention.

Turning now to FIG. 4, there is shown a Steerable Hearing Aid Compatible Device (SHAD) in the form of an Enhanced Inductive Module (EIM) 400. This EIM 400 is shown in the form of an electronic device that may be attached to or made integral with a Wearable Audio-output Device (WAD) 402 such as, but not limited to, ear buds, headphones, headsets, and the like, in communication with an Electronic Transmission Device (ETD) 404 through a wired or wireless interface 406. The ETD 404 is a means for audio communication as are all devices configured to receive and/or store and/or transmit signals to be emitted, received, or decoded as sound, including: radios, televisions, walkie-talkies, telephones, receivers, computers, Bluetooth® devices, audio-file storage devices, audio-file player devices, electronic medium players, tape players, compact disc players, components thereof, and the like.

The illustrated ETD 404 includes a signal source such as a receiver or a database. For purposes of teaching and not limitation, this embodiment of an ETD 404 is shown with a database 410. The illustrated EIM 400 includes an RFID Reader 412, a controller 414 having a stored memory 416 and a micro-processor 418, an amplifier 420, and a steerable telecoil 422 all connected by a power and signal bus (not shown). Elements not critical to the present teaching and well understood by those skilled in the art, such as the power supply, are not discussed. The RFID Reader 412 provides a means for receiving the TLI of a THAD. Here, the RFID Reader sends interrogation signals and receives replies from RFID tags in a THAD.

In operation, an audio signal or audio file is retrieved, accessed, transmitted, or otherwise output from the signal source 410 via the interface 406 to the micro-processor 418 of the controller 414 for processing. After the signal is processed and output, the audio signal may be boosted by the amplifier 420 before being emitted by steerable telecoil 422. It should be noted that a purpose of the controller is to orient the magnetic field, although the figure does not show a direct connection therebetween.

Memory 416 may store the necessary programs to operate the steerable telecoil as well as additional information related to the TLI that is provided, as well as related programs required for the EIM 400 and/or the WAD 402 and/or the ETD 404. Further, some embodiments of the EIM 400 may allow for the retrieval of information related to the TLI, such as adjustments to the TLI based upon the particular style or make of the THAD to which it is related. Memory 416 may be read only (ROM) or random access (RAM), as the design needs require. With the TLI loaded onto or otherwise accessible to the micro-processor 418, the illustrated DM 400 is enabled to provide an inductive field according to the location and orientation of the telecoil in the THAD with which it communicates. That is, the EIM 400 is configured to operate in the enhanced mode.

Figure 5:
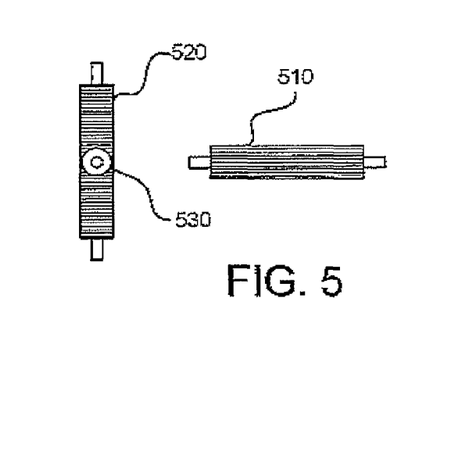
FIG. 5 is a side view of an array of telecoils for steering an inductive field of a hearing aid compatible device in accordance with an exemplary embodiment of the invention.
Figure 6:
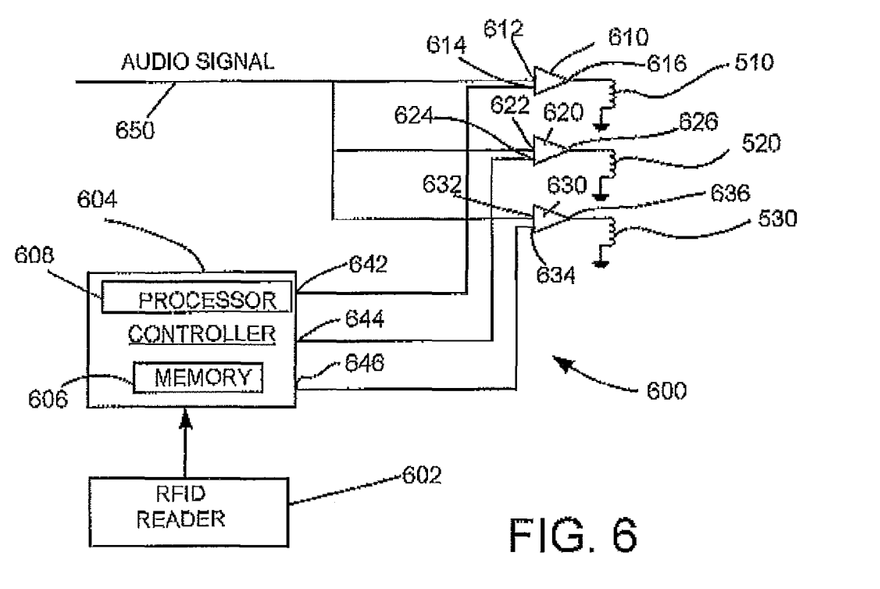
FIG. 6 is a diagram of a system for orienting the inductive field of a hearing aid compatible device in accordance with an exemplary embodiment of the invention.
Figure 7:
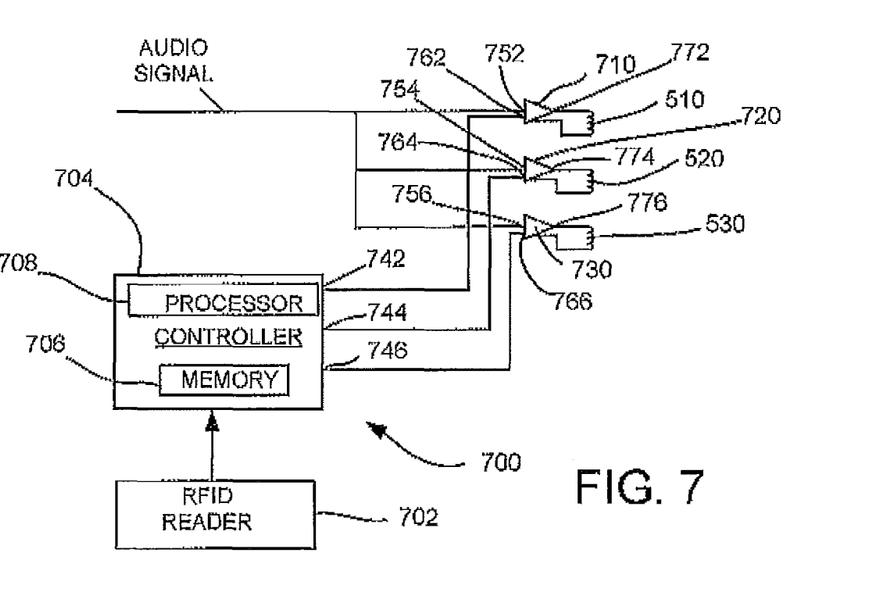
FIG. 7 is a diagram of a system for orienting the inductive field of a hearing aid compatible device in accordance with an exemplary embodiment of the invention.

In another aspect of the invention, FIGS. 5-7 show a steerable telecoil system that may be used to position an inductive field at a desired location and orientation for coupling with a telecoil of a THAD. As shown in FIG. 5, first 510, second 520, and third 530 telecoils may be provided in an orthogonal relationship and manipulated as shown in FIGS. 6 and 7 to allow the reorientation of an inductive field generated by the telecoils.

FIG. 6 shows an exemplary embodiment of a phase steerable telecoil system 600 which may include first 510, second 520 and third 530 orthogonal positioned transmitting telecoils coupled with first 610, second 620 and third 630 phase control devices. An RFID Reader 602 is provided for sending an interrogation signal and receiving response signals, and otherwise communicating with an RFID tag of a THAD so as to provide information regarding the location and orientation of the telecoil within the THAD. A controller 604, comprising an optional processor 608 and optional memory 606, is communicatively coupled to the RFID Reader 602, the first 610, second 620, and third 630 phase control devices, and the first 510, second 520 and third 530 transmitting telecoils.

In operation, the controller 604 receives signaling from the RFID Reader 602 including telecoil location information (TLI) from an RFID tag as discussed above. The controller 604 processes the TLI to determine a desired location and orientation for an inductive field such as a position that is proximate and aligned with the telecoil of a THAD associated with the TLI. The controller 604 then generates and outputs first, second, and third phase signals at first 642, second 644, and third 646 phase control outputs to the first 610, second 620 and third 630 phase control devices, respectively, to generate an inductive field at the desired location and orientation in response to the telecoil of the THAD, to align the magnetic axis of a transmitting telecoil and the magnetic axis of the THAD telecoil, and minimize the distance between them.

Thus, the phase control devices 610, 620, 630 receive an audio signal at audio inputs 612, 622, 632, respectively, first, second, third phase control signals from the controller 604 at first 614, second 624, third 634 phase control inputs, and adjust the phase of the audio signal according to the first, second and third phase signals from the controller 604 to produce a first, second and third phase-shifted audio signal at outputs 616, 626, 636, respectively to produce a composite field having an orientation determined by the phase-shifted audio signal transmitted by each of the telecoils.

In this configuration, the RFID reader 602 is again used to signal a request for a change in the position of the inductive field. This request signal is communicated to the controller 604 which processes the TLI into first, second and third phase signals to generate a desired inductive field. The composite magnetic field can be shifted in different directions by introducing different delays to the signals exciting each of the telecoils.

FIG. 7 shows an exemplary embodiment of an amplitude steerable telecoil system 700 in which three telecoils are arranged in a 3-D orthogonal array such that a resultant inductive field may be steered by varying the amplitude of the signal to each telecoil to create a composite inductive field having the desired orientation. First 510, second 520 and third 530 orthogonal transmitting telecoils may be coupled with first 710, second 720 and third 730 amplitude control devices. An RFID Reader 702 is provided for sending an interrogation signal and receiving response signals, and otherwise communicating with an RFID tag of a THAD so as to provide information regarding the location and orientation of the telecoil within the THAD. A controller 704 is communicatively coupled to the RFID Reader 702 and the first 710, second 720, and third 730 amplitude control devices and the first 510, second 520 and third 530 transmitting telecoils. Controller 704 may include memory 706 and processor 708. The controller 704 has a first, second, and third gain signal and is operative to receive TLI signaling from the RFID Reader 702 indicating the location and orientation of a telecoil within a device. The controller 704 processes the TLI signaling into a first gain signal, a second gain signal, and a third gain signal and outputs the first gain signal at the first 742, second 744, and third 746 gain signal outputs, respectively.

In operation, the controller 704 receives signaling from the RFID reader 702 including information regarding the location and orientation of a telecoil of a device, from an RFID tag associated with the device as discussed above. The controller 704 processes the orientation signaling to produce a first, second, and third gain signals to the first 710, second 720 and third 730 amplitude control devices, respectively. The amplitude control devices receive an audio signal and control the amplitude of the audio signal according to the first, second and third gain signals from the controller 704 to produce a first, second and third amplitude adjusted audio signal to produce a composite field having an orientation determined by the amplitude adjusted audio signal transmitted by each of the telecoils.

Each of the first 710, second 720, and third 730 amplifiers is operative to receive a common audio signal at the respective audio signal input 752, 754, 756 and receive a gain signal at the respective gain control input 762, 764, 766, amplify the audio signal based on the respective gain signal, and output the amplified audio signal at the respective signal output 772, 774, 776.

Each of the first 510, second 520, and third 530 telecoils is operatively connected to the signal output 772, 774, 776 of the respective amplifier such that a composite inductive field will be created by the orthogonal telecoil array.

Figure 8:
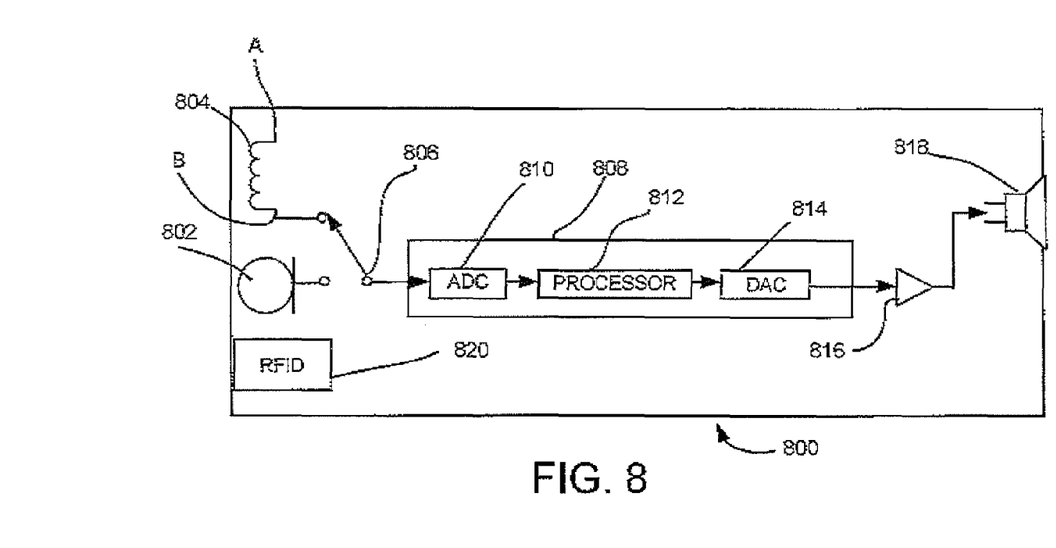
FIG. 8 is a block diagram of a THAD in accordance with an exemplary embodiment of the present invention.

Turning to FIG. 8, there is shown an exemplary embodiment of a THAD. In this embodiment, the THAD is a hearing aid 800, having a microphone 802 for receiving audio signals and a telecoil 804 for coupling with an inductive field of a SHAD. A switch 806, either manual or electronic in nature, may be provided to allow the switching between the microphone and the telecoil or both. Switch 806 may be under control of controller 808 which further receives input from the microphone or telecoil. The controller may include an optional analog to digital converter 810, a processor 812, and an optional digital to analog converter 814. An amplifier 816 and a speaker 818 may also be provided as known in the art, so that the hearing aid 800 receives signals from the microphone 802 and/or telecoil 804, converts the signals to digital at the analog to digital converter 810, processes the signal in accordance with predetermined settings of the processor 812, converts the digital signal to analog with the digital to analog converter 812, and provides a resultant audio signal at the speaker 818.

An RFID Tag 820 is provided. The RFID tag includes TLI stored in its memory. The TLI may include orientation and position information of the telecoil 804. The RFID reader may be interrogated by an RFID reader of a SHAD as discussed above and when interrogated transmits an RF signal containing the TLI. The TLI may then be used by the SHAD to orient an inductive field for inductive coupling of the telecoil 804 of the hearing aid with a telecoil of the SHAD. In an exemplary embodiment, the TLI includes a first and second end point of the telecoil in a predetermined reference system.

In another aspect of the invention, a system is provided that allows the determination of the relative position of a telecoil in a hearing aid worn by a user and an inductive field created by a SHAD being used by the user. In an exemplary embodiment, a first reference system is created with regard to the user and the reference system is applied to a THAD, while a second reference system is created using a hypothetical standard based upon a standard hearing aid, a standard telecoil location and orientation in the hearing aid, and a standard user. A three dimensional orthogonal reference system having three orthogonal axes is created corresponding to the standard position of the telecoil in relation to the body of the hypothetical user. The reference system is then overlaid on a SHAD and used to determine the relative location and orientation of the telecoil within a hearing aid in relation to the reference system. A second reference system is established based upon a standard position of a SHAD and coordinated with the first reference system. The coordinates of an actual location and orientation of a telecoil within a THAD may then be represented as coordinates in a reference system and stored on the THAD. These coordinates may then be retrieved by the SHAD and used to orient an inductive field to optimize the coupling between the inductive field and the telecoil.

A reference system may be established for a THAD. In an exemplary embodiment, a reference system is established in relation to a defined reference point on a hypothetical user, such as the location and orientation of a standard telecoil within a standard hearing aid in reference to a hypothetical user wearing the hearing aid. This reference point may be referred to as the Standard Telecoil Point (STP). A reference system may then be established in reference to the body of the user in relation to this point, i.e., the origin of the reference system may be set to the STP, thereby defining an STP reference system with reference to the standard user. For example, an x axis may be established pointing inward toward the side of the users' head, a y-axis pointing to the back of the users' head and a z-axis pointing upward. This reference system may then be overlaid on an individual hearing aid, i.e., the point on a particular hearing aid that would correspond to the STP when inserted in the standard ear is established. For example, the hearing aid may be mounted in or on a jig representing a human ear canal and orthogonal sensors can be provided to locate the telecoil by triangulation or other means for locating with regard to the x, y, and z axes of the STP reference system. The actual location and orientation of a telecoil within a hearing aid may then be measured from the STP point on the hearing aid that, when the hearing aid is inserted into a hypothetical person, corresponds to the STP. Thus, coordinates within this reference system would establish the location and orientation of the actual telecoil within the hearing aid from STP. While the use of the term "point" is used herein, it is contemplated that the location and orientation of the telecoil and locations provided on the reference systems may include more than one point, and preferably include two or more points, for instance points which represent a first end and second end of a telecoil such as to provide for the position of the telecoil in three dimensional space as the line between the two reference points.

A reference system may also be established on the SHAD, defining the orientation of the SHAD with respect to a user. For example, a default position of the phone may be established and an orthogonal reference system created based upon this default position. For example, a default position may be defined as the position of a cell phone when held in a typical usage position, such as an ear piece proximate to an ear and mouth piece proximate to mouth position. This reference system preferably mirrors the reference system of the hearing aid, with an x-axis pointing in to the user, a y-axis pointing to the back of the user, and a z-axis pointing upward. In other words, the axes of the THAD reference system corresponds to those of the STP reference system, thus allowing the SHAD to approximate the location and orientation of the STP when the phone is at a standard position.

The THAD reference system and the SHAD reference system may thus both be coordinated to the STP reference system. For example, a default position for the inductive field generated by the SHAD could be established so as to produce a maximum coupling between the default magnetic field and a telecoil located at the STP. This could be the position of the inductive field when a SHAD operates in non-enhanced mode. The position of a telecoil within a THAD may be measured in reference to the overlaid STP reference system to determine x, y, and z coordinates for the telecoil. Given these coordinates, the SHAD can approximate the location and orientation of the telecoil when worn by the user, and can determine a desired location and orientation for an inductive field for coupling with the telecoil. For example, at the time of manufacture the position of a telecoil within a hearing aid could be measured from the point on the hearing aid that would correspond to the STP. This information can then be stored on an RFID tag within the hearing aid and later retrieved by a SHAD to approximate the location and orientation of the telecoil with respect to the SHAD. The SHAD could then orient an inductive coupling according to the actual location and orientation.

Figures 9, 10:
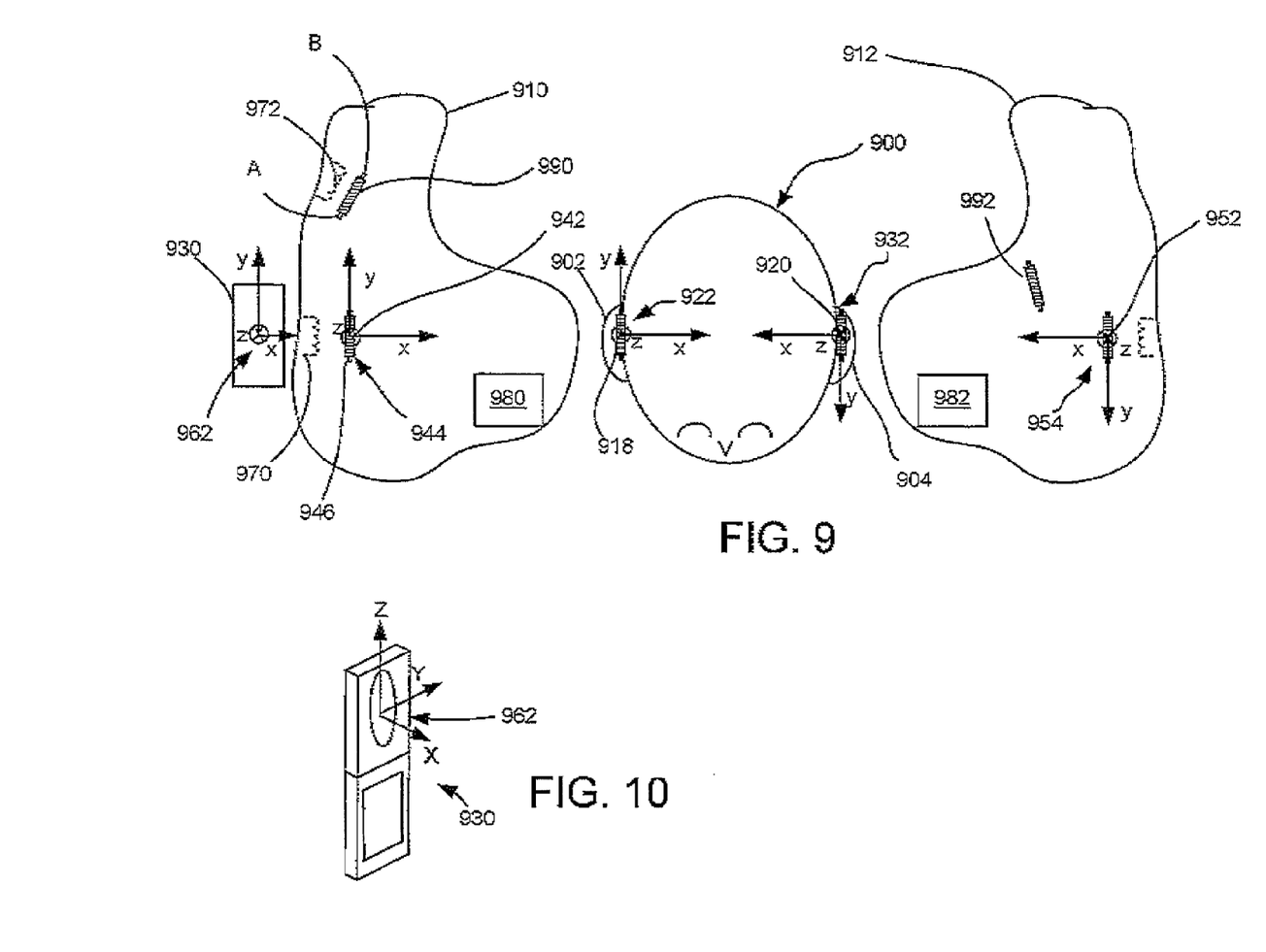
FIG. 9 shows an overhead view of a user having a right ear hearing aid and a left ear hearing aid showing predetermined reference systems in accordance with an exemplary embodiment of the invention.
FIG. 10 shows a perspective view of a SHAD and a SHAD reference system in accordance with an exemplary embodiment of the invention.

FIG. 9 shows a top view of a user 900 having a right 902 and left 904 ear in which right 910 and left 912 hearing aids (shown enlarged) are worn, respectively. A predetermined Standard Telecoil Position 918, 920 is shown at the right 902 and left 904 ears, respectively, and each represents the hypothetical location and orientation of a standard telecoil when a standard hearing aid containing the telecoil is worn by a standard user.

A right STP reference system (RSTPS) 922 is shown having an origin at the STP 918 of the right ear 902 and defining a coordinate system having x, y, and z orthogonal axes. As shown, an x-axis points horizontally inward toward the side of the user's head, a y-axis points horizontally toward the rear of the users' head, and a z-axis points upwardly. As discussed above, the STP 918 represents a predefined point where a telecoil of a hypothetical hearing aid is located and oriented when worn by a hypothetical person.

Likewise, a left STP reference system (LSTPS) 932 is shown having an origin at the left STP 920 of the left ear and defining a coordinate system having x, y, and z orthogonal axes, with the x-axis pointing horizontally inward toward the side of the user's head, the y-axis, pointing horizontally toward the front of the users' head, and the z-axis pointing upwardly.

A THAD Reference System (TRS) is shown provided on each of the right 910 and left 912 hearing aids. On the right hearing aid 910, a Right Hearing Aid Standard Telecoil Position (RHASTP) 942 is shown which represents the location of the hearing aid 910 that corresponds with the RSTP 918 when the right hearing aid is worn by the hypothetical user. This reference point may be determined by the hearing aid manufacturer. The corresponding position of the hypothetical telecoil is shown by telecoil 946. A Right THAD Reference System (RTRS) 944 is thus created on the right hearing aid 910, having the RHASTP 942 as the origin, which when the right hearing aid 910 is worn by the user 900 will correspond to the RSTP 918. The RTRS 944 has three orthogonal axes, x, y, and z which correspond to the axes of the RSTPS reference system 922. Thus, the RTRS 944 represents an overlay of the STP reference system 922 atop the hearing aid 910 as if the hearing aid 910 were positioned in the ear.

Likewise, a TRS is provided on the left hearing aid 912. A Left Hearing Aid Standard Telecoil Position (LHASTP) 952 is determined which represents the location on the left hearing aid 912 that will correspond with the LSTP 920 when the left hearing aid 912 is worn by the user 900. A left THAD Reference System (LTRS) 954 is thus created on the left hearing aid 912, having the LHASTP 952 as the origin. The LTRS has three orthogonal axes, x, y, and z, which correspond to the axes of the STP reference system. Thus, the LTRS 954 represents an overlay of the LSTP reference system 932 atop the left hearing aid 912 as the hearing aid 912 would be positioned in the left ear. Thus, the y-axis on the left hearing aid 912 points in the opposite direction of the y-axis on the right hearing aid 910. This allows the reference system of SHAD to stay the same whether the THAD is being used with a right or left ear.

A SHAD, shown as a cell phone 930 has a SHAD reference system (SRS) 962. The SRS defined on the SHAD may be an orthogonal reference system, such that when the SHAD is held in a standard position, such as an ear piece proximate to the ear and mouthpiece proximate to the mouth, the x-axis points inward toward the side of the user's head, the y-axis to the back of the users' head, and the z-axis upward. Thus the axes of the SRS 962 align with the axes of the RSTPS 922 and LSTPS 932 when the cell phone 930 is held in the standard position at the right or left ear 902, 904, and align with the RTRS 944 when the right hearing aid 910 is worn by a user and the cell phone 930 is held in a standard position by the user at the right ear, and align with the axes of the LTRS 954 when held at a standard position at the left ear 904. With brief reference now to FIG. 10, which shows a SHAD reference system 962 in a perspective view, a default location 970 of an inductive field may be established at a location that is proximate to and aligned with the left and right STP 918, 920 when held in the left and right standard positions respectively. With the alignment of the SRS 962 and the RTRS 944, the position of the right STP 918 to the cell phone may be determined and thus, the relative position of the telecoil within a hearing aid worn by a user with respect to the cell phone may be determined by referencing the distance of the telecoil from the RSTP 918 (or LSTP 920) along the RTRS 944.

As shown in the illustrated embodiment of FIG. 9, a first telecoil 990 is actually located within the right hearing aid 910 and has end points A and B within the RTRS 944. Thus, the location of both of these points can be determined in reference to the RTRS 944 as the distance along each axis from the RHASTP 942. These two points can then be used to determine the three dimensional location of the telecoil 990. The SHAD can then use these dimensions to determine the optimal location and orientation of an inductive field and move the inductive field from a default position 970 to a desired position 972.

An RFID tag 980, 982 may be provided on either or both of the right 910 and left 912 hearing aids respectively to store the coordinates of the telecoil 990, 992 in the reference system. This information may then be retrieved, such as by an RFID reader (not shown) on the SHAD and used to determine the desired location and orientation of an inductive field.

The operation of the exemplary embodiment shown in FIGS. 9-11 will be described. As shown in FIG. 9, a cell phone 930 may be placed proximate a user's 900 right ear 902 in a standard orientation and an inductive communication mode be initiated. The inductive mode may be initiated automatically, such as by a proximity or other sensor, or manually such as by the user turning a switch (not shown) on the device. With the induction mode initiated, an RFID reader (not shown) of the cell phone 930 broadcasts an interrogation signal to the RFID tag 980 on the right hearing aid 910 and receives a response from the RFID tag 980 providing the coordinates A and B of the telecoil in the RHASTP 942. A controller (not shown) within the cell phone 930 receives the coordinates, or TLI, and reorients an inductive field from a default position 970 to a desired position 972 which is proximate to and aligned with the telecoil 990. The SHAD thus enters the enhanced induction mode providing the inductive field 972 at the desired location and orientation. Thus, the inductive field is reoriented from the default position to the desired position. The SHAD may continue to periodically send an interrogation signal to the RFID tag 980 and determine if it receives a response from the same RFID tag 980, no signal, or a response from a new RFID tag, such as left RFID tag 982 in left hearing aid 912.

Figure 11:
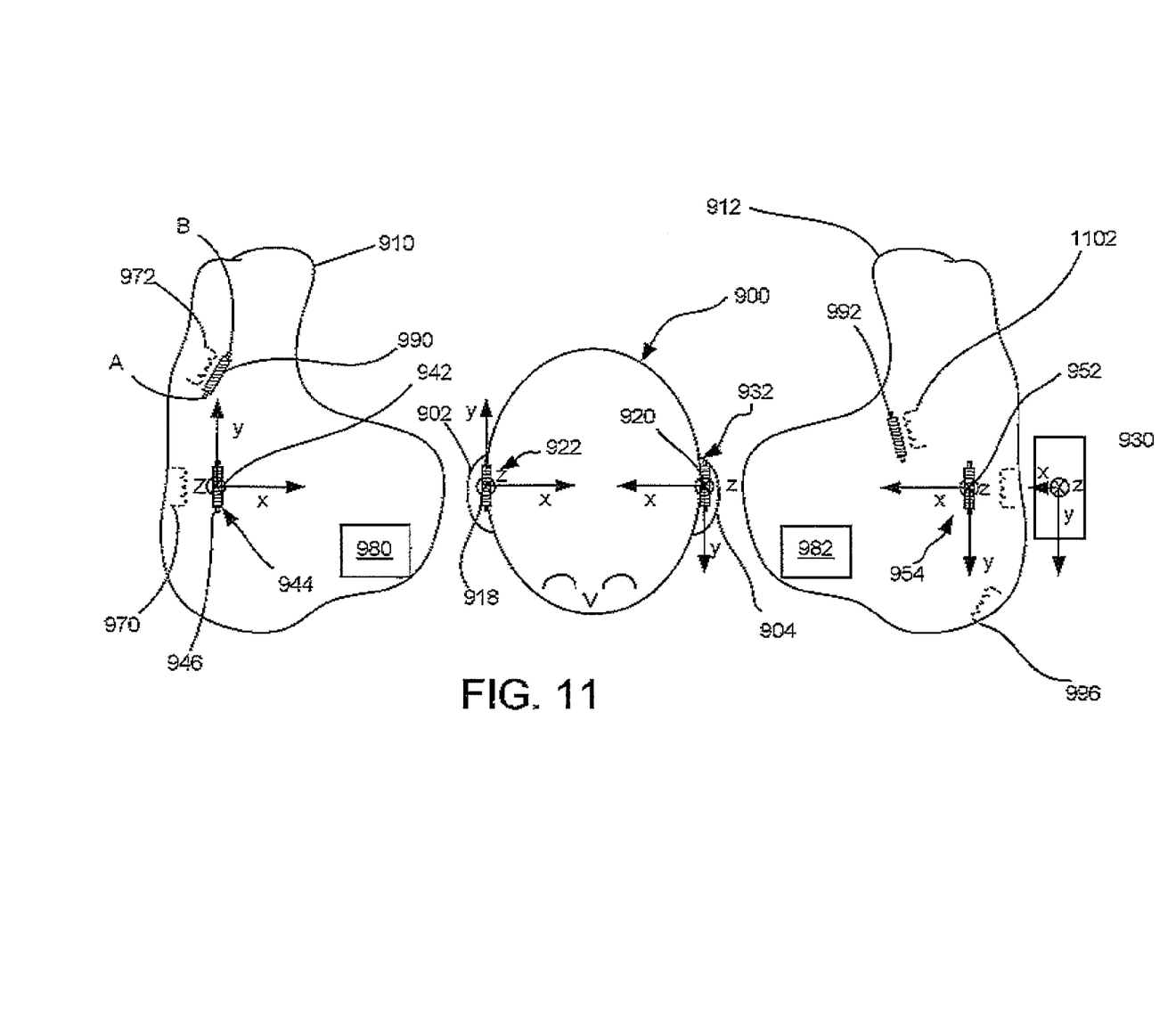
FIG. 11 shows an overhead view of a user using a SHAD proximate the left ear in accordance with an exemplary embodiment of the invention.

As shown in FIG. 11 if the user switches the cell phone 930 to the left ear 904 the interrogation signal will receive a response from the left RFID tag 982 of the left hearing aid 912. The coordinates of the telecoil 992 of the left hearing aid 912 are stored on left RFID tag 982 so that when the left RFID tag 982 is interrogated, it is activated and sends the stored coordinates to the RFID reader. Thus, the left RFID tag 982 provides the TLI data associated with the left hearing aid 912 to the cell phone 930 and the controller within the SHAD determines a desired location and orientation of the inductive field 1102 with respect to telecoil 992. The cell phone 930 will then operate in a second enhanced mode and periodically send an interrogation signal and determine if the user wants to end enhanced mode or inductive mode and terminate as discussed above. As shown in FIG. 11, if the cell phone 930 did not reorient the inductive field with relation to the cell phone 930, the inductive field would be at a location 996 of the left hearing aid 912, thus providing an example of why the y-axis of the LSPTS is inverted from the y-axis of the RSPTS.

In various embodiments the optional memory (i.e., 606, 706) may also store any of the information associated with the location or orientation of a telecoil, or any of the information associated with a reference system(s), or any of the information associated with the coupling devices, such as but not limited to the TL1, STP, RHASTP, LHASTP, and any of the inductive field positions. One reason for storing this information is so that an HCAD may be preprogrammed by a manufacturer, supplier, or audiologist; another reason is so that HCAD performance characteristics may be selectively available by one or more users.

The law does not require and it is economically prohibitive to illustrate and teach every possible embodiment of the present invention. Hence, the above-described embodiments are merely exemplary illustrations of implementations set for forth a clear understanding of the principles of the invention. Many variations or combinations may be made to the above-described embodiments without departing form the scope of the claims. All such variations of combinations are included herein by the scope of this disclosure and the following claims.

What is claimed is:

1. A method comprising:
   determining, by a processor, a hearing-assistive-device reference system;
   generating, by the processor, using a location determined at a telecoil of a hearing-assistive device and using the hearing-assistive-device reference system, telecoil location information; and
   initiating coupling, using the telecoil location information, of the telecoil and an inductive field emitted by a communication device.

2. The method of claim 1, further comprising determining a communication-device reference system for use in initiating the coupling.

3. The method of claim 2, further comprising correlating the hearing-assistive-device reference system and the communication-device reference system for initiating the coupling.

4. The method of claim 1, further comprising initiating storage of the telecoil location information on a telecoil orientation tag.

5. The method of claim 4, wherein the telecoil orientation tag comprises a radio-frequency identification tag.

6. The method of claim 1, further comprising providing the telecoil location information to the communication device.

7. A hearing-assistive apparatus, comprising:
- a telecoil configured to couple with an inductive field of a communication device; and
- a telecoil orientation tag configured to provide telecoil location information to the communication device;
- wherein the telecoil location information indicates a location of the telecoil with respect to a predetermined reference system.

8. The hearing-assistive apparatus of claim 7, wherein the telecoil location information indicates at least two points in a three dimensional coordinate system.

9. The hearing-assistive apparatus of claim 7, further comprising a processor in communication with the telecoil.

10. The hearing-assistive apparatus of claim 9, further comprising a computer-readable storage medium having instructions that, when executed by the processor, cause the processor to process a signal received by the telecoil.

11. The hearing-assistive apparatus of claim 10, wherein:
- the processor, in executing the instructions to process the signal, transmits the signal to an audio output device; and
- the hearing-assistive apparatus further comprises the audio output device being configured to receive the signal from the processor and to output the signal.

12. The hearing-assistive apparatus of claim 11, further comprising an analog-to-digital converter configured to receive the signal from the telecoil, convert the signal to a digital signal, and provide the digital signal to the processor.

13. The hearing-assistive apparatus of claim 12, further comprising a digital-to-analog converter configured to receive the digital signal from the processor, convert the digital signal to an analog signal, and to provide the analog signal to the audio output device.

14. The hearing-assistive apparatus of claim 7, wherein the telecoil orientation tag comprises a radio-frequency identification tag.

* * * * *